June 3, 1969 C. GUNN-RUSSELL 3,448,347
CONTROL CIRCUITS
Filed Oct. 14, 1965 Sheet 1 of 3
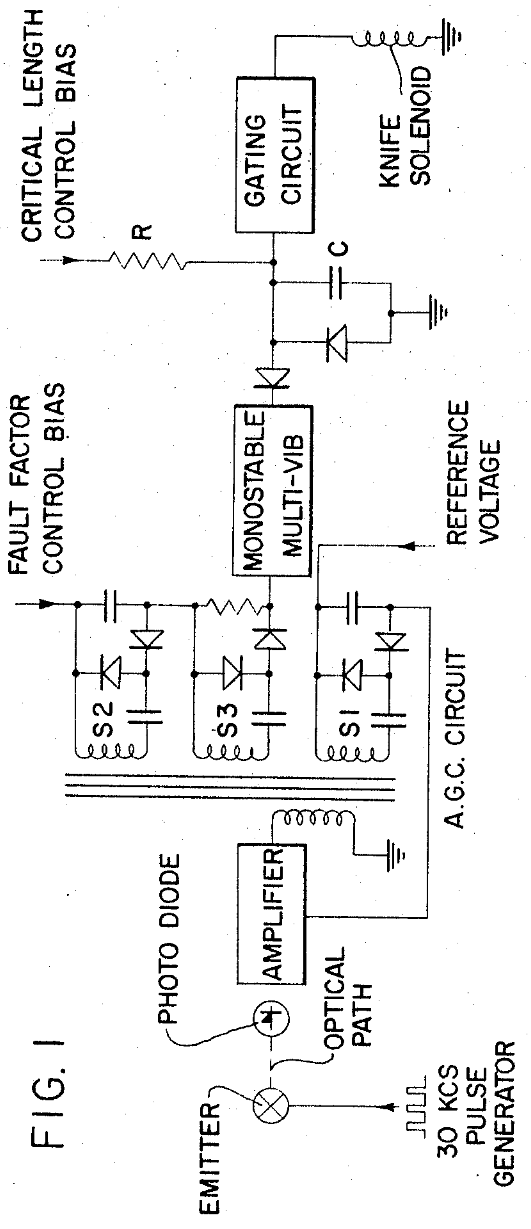
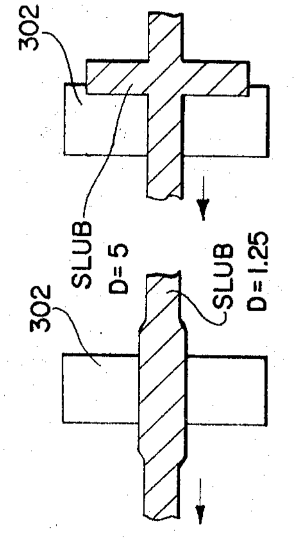
FIG. 3B FIG. 3A
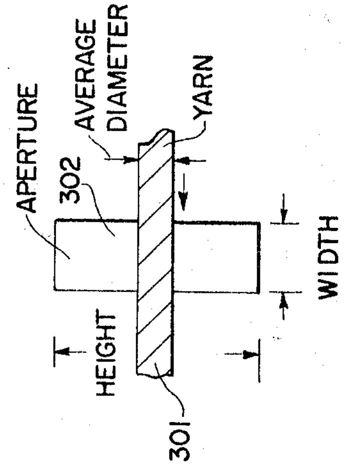
FIG. 2
INVENTOR.
CHARLES GUNN-RUSSELL
BY Albert P. Davis
Burnett W. Norton
ATTORNEYS INVENTOR
CHARLES GUNN-RUSSELL
BY Albert P. Davis
Burnett W. Norton
ATTORNEYS INVENTOR.
CHARLES GUNN-RUSSELL
BY Albert P. Davis
Burnett W. Norton
ATTORNEYS United States Patent Office 3,448,347
Patented June 3, 1969

3,448,347
CONTROL CIRCUITS
Charles Gunn-Russell, London, England, assignor to Leesona Corporation, Warwick, R.I., a corporation of Massachusetts
Filed Oct. 14, 1965, Ser. No. 496,005
Claims priority, application Great Britain, Oct. 16, 1964, 42,343/64
Int. Cl. H01h 47/00; H03k 5/20, 17/00
U.S. Cl. 317—123 5 Claims

ABSTRACT OF THE DISCLOSURE

A control circuit in which a pulsed carrier wave is modulated by faults upon scanning a length of yarn, and in which a capacitor and a resistor are connected with a pulse circuit and a source of DC potential such that the circuit and source affect the potential on the capacitor in opposite senses to operate a gating circuit which provides a control output to actuate a yarn cutter when the potential on the capacitor passes a critical value. The pulse circuit contains an inertia circuit to minimize circuit drift.

The present invention has an object the provision of a control circuit of novel and improved form.

In accordance with the present invention there is provided a control circuit which comprises a capacitor connected with a source of DC potential via a resistor and with a pulse circuit, and a Schmitt trigger or other gating circuit operable to give a control output when the potential on the capacitor passes a critical value, the arangement being such that the pulse circuit and the source of DC poetntial affect the potential on the capacitor in opposite causes.

For simplicity of description it will be assumed hereinafter that the capacitor is charged by the source of DC potential and discharged by the pulse circuit and it will also be assumed that the gating circuit gives its control output when the potential on the capacitor rises above the critical value. Other arrangements are, however, possible, including arrangements in which the source of DC potential is at zero volts as for example when the capacitor is grounded via the resistor.

A preferred application of the control circuit is to a scanning apparatus which is an improvement in or modification of a scanning apparatus for scanning linear material, for example yarns for the detection of faults, in which the faults reduce the level of a pulsed carrier waveform. In a typical arrangement the amplifying device for the carrier frequency is used as the pulse circuit. Advantageously, the pulse output from the amplifying device is connected in series opposition with a further output therefrom which contains an inertia circuit; with this arrangement the further output sets as a reference circuit operating to minimize circuit drift.

The following description, in which reference is made to the accompanying drawings is given by way of illustration.

In the drawings:

FIG. 1 is a schematic circuit drawing which shows an apparatus in accordance with the invention.

FIG. 2 is a diagrammatic drawing of yarn passing across an illuminated aperture of an optical scanning head used in the apparatus of FIG. 1.

FIGS. 3*a* and 3*b* show respectively, slubs of diameter 1.25 times and 5 times the mean diameter of the yarn moving across or entering the aperture 302.

Figure 4A:
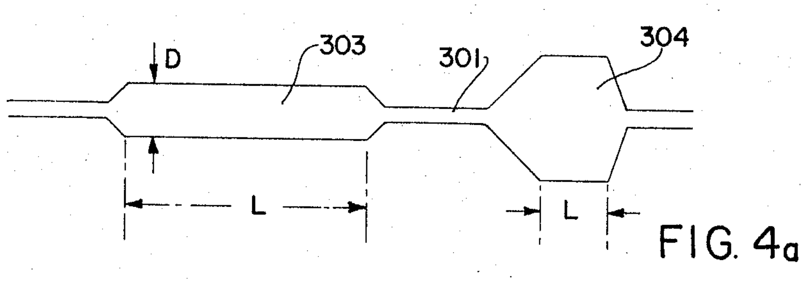
Figure 4B:
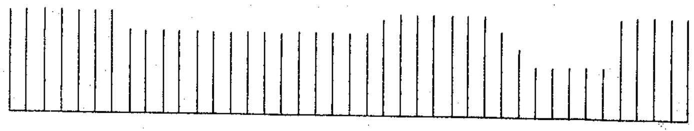
Figure 4C:
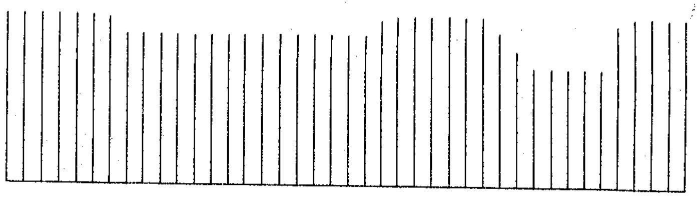
Figures 4D, 4E:
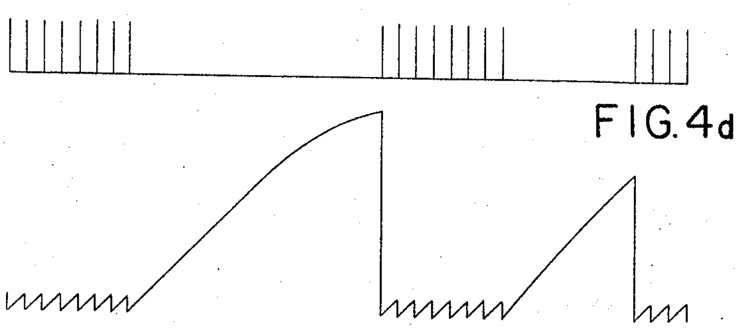
Figure 5:
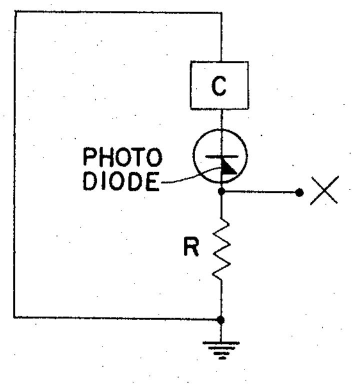
Figure 6:
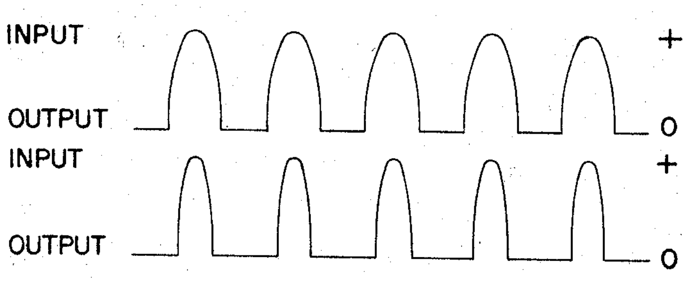
Figure 7:
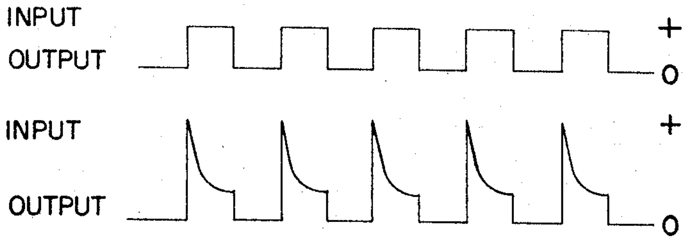

FIGS. 4*a* to 4*e* are diagrams showing in FIG. 4*a* a yarn having two thickness variations, one in length and one in diameter;

FIG. 4*b* shows the effect of yarn variation on amplifier output;

FIG. 4*c* shows the effect of yarn variations on the input to a monostable multivibrator;

FIG. 4*d* shows the effect of yarn variations on the output from the monostable multivibrator;

FIG. 4*e* shows the input to a gating circuit;

FIG. 5 shows a modification of the apparatus in which a steady light source is employed and a photodiode is biased with a pulsed waveform, and FIGS. 6 and 7 show the input and output waveforms of photodiode when biased respectively by an input signal of small mark to space ratio and input of square wave configuration.

The emitter or light source shown in FIG. 1 is a semiconductor device operating at 0.9$\mu$ in the infra-red region and pulsed at a repetition frequency of 30 kcs. at a pulse width of between 5 and 10 microseconds. The photodiode also peaks at 0.9$\mu$, this arrangement tending to reduce the effects of ambient light.

The output from the amplifier is fed to a transformer having three secondaries, S1, S2 and S3. Secondary S1 feeds into a conventional DC restoration rectifier circuit which supplies an AGC signal for the amplifier, maintaining the average output constant within a range of ±10%. Secondary S2 feeds into a similar circuit, having a long time constant one side of the output of which is connected, in a series opposition arrangement with the output from S3 and a further DC restoration rectifier circuit. The other side of the output of the cicuit fed by S2 is conneced with a source of variable DC bias indicated as the "fault factor control bias."

The series opposed output is fed to a monostable multivibrator which produces a pulse of fixed amplitude at its output for each incoming pulse which exceeds a certain amplitude. The output pulses are applied to discharge a capacitor C which is charged via a resistor R from a variable DC bias indicated as the "critical length control bias." A gating circuit for example of the monostable multivibrator type, responsive to the potential on capacitor C de-energize a solenoid to allow a knife to operate for cutting the yarn when the said potential reaches a certain threshold level. The gating circuit is arranged to de-energize, rather than energize the solenoid, so that the yarn is cut automatically if the apparatus ceases to operate. A Schmitt trigger may be used as the gating circuit, but is not preferred as it tends to de-energize the knife solenoid for insufficient time.

Referring now to FIGURES 4*a* and 4*c* it will be seen that when a slub 303 lies across the aperture 302, the illumination reaching the photodiode is reduced to cause a corresponding reduction in the amplitude of the DC restored pulses at the output of secondary S3. Assuming that the diameter of the slub exceeds a critical diameter D determined by the fault factor control bias, no output is obtained from the multivibrator. Accordingly, the charging of the capacitor C through the resistor R is unopposed and the input potential to the gating circuit rises. If the length of the slub is greater than the critical length L determined by the critical length control bias, the trigger is tripped to allow the knife to operate and thereby cut the yarn.

With slubs such as the slub 304 whose length is less than that set by the critical length control bias, the potential on the capacitor C does not rise sufficiently to trip the trigger and the knife does not therefore operate.

As will be understood, the apparatus has two separate controls which may be set respectively to determine the increase in diameter and the length of a slub required to operate the knife. In this way cutting may be avoided in response to slubs which are too short to be objectionable. Moreover, the apparatus is able to distinguish between thin slubs long enough to be objectionable and thick slubs of acceptable shortness.

The two conditions shown in FIGS. 3*a* and 3*b*, one involving a long thin slub extending across the aperture, and the other involving the starting of a thick slub to cross the aperture, may both cause the illumination reaching the photodiode to be reduced by the same amount. However, the two conditions are distinguishable by the apparatus since a fault must persist for a long enough period to allow capacitor C to charge before the knife operates.

Obviously the apparatus distinguishes lengths of slubs in the terms of the time during which they reduce the amount of light passing through the aperture and this time depends of course on the yarn speed, which is typically from 250 to 1250 yards per minute. The critical length control bias must therefore be altered if the yarn speed is changed. Advantageously this bias is obtained from a circuit having two controls marked respectively in terms of speed and length.

The function of the multivibrator is to ensure that the pulses reaching the capacitor C are of constant amplitude. Another way in which a similar result may be obtained is to pass the pulses from S2, S3 through a limiter, although the pulses may be fed directly to the capacitor if only an approximation is desired.

While this invention has been described with reference to particular embodiments in a particular environment, various changes may be apparent to one skilled in the art and the invention is therefore not to be limited to such embodiments or environment except as set forth in the appended claims.

What I claim is:

1. A control circuit comprising a source of DC potential, means for producing a pulsed carrier wave modulated responsive to scanning faults in a length of attentuated material and including a pulse circuit, a capacitor, a resistor electrically connected to the capacitor, the capacitor and resistor electrically connected with the source and with the pulse circuit such that the pulse circuit and the source affect the potential on the capacitor in opposite senses, and a gating circuit electrically connected to the resistor and to the capacitor to provide a control output when the potential on the capacitor passes a critical value.

2. A control circuit as claimed in claim 1 in which the pulse circuit comprises means including amplifier means to amplify the modulated pulsed carrier wave.

3. A control circuit as claimed in claim 2 further comprising means including a reference circuit electrically connected with said amplifier such that the amplified pulsed carrier wave emitted by the amplifier is opposed by the output from the reference circuit so as to minimize circuit drift.

4. A control circuit as claimed in claim 3 further comprising a solenoid, electrically connected with the gating circuit, to be actuated upon discharge of the capacitor.

5. A control circuit as claimed in claim 1 in which the source of DC potential is at zero volts when the capacitor is grounded via the resistor.

References Cited

UNITED STATES PATENTS 3,200,306 8/1965 Atkins et al.

LEE T. HIX, *Primary Examiner.*

U.S. Cl. X.R.

307—149, 154; 328—1, 115, 150